(12) United States Patent
Werner et al.

(10) Patent No.: US 7,575,250 B2
(45) Date of Patent: Aug. 18, 2009

(54) CROSS MEMBER FOR A MOTOR VEHICLE

(75) Inventors: Mark Werner, LaSalle (CA); Gianfranco Gabbianelli, Troy, MI (US)

(73) Assignee: Magna International Inc., Aurora, Ontario (CA)

( * ) Notice: Subject to any disclaimer, the term of this patent is extended or adjusted under 35 U.S.C. 154(b) by 677 days.

(21) Appl. No.: 10/527,667

(22) PCT Filed: Sep. 22, 2003

(86) PCT No.: PCT/US03/30195

§ 371 (c)(1),
(2), (4) Date: Mar. 11, 2005

(87) PCT Pub. No.: WO2004/028882

PCT Pub. Date: Apr. 8, 2004

(65) Prior Publication Data

US 2006/0012162 A1    Jan. 19, 2006

Related U.S. Application Data

(60) Provisional application No. 60/414,417, filed on Sep. 30, 2002.

(51) Int. Cl.
*B62D 21/00*    (2006.01)
*B62D 24/00*    (2006.01)
*B62D 21/12*    (2006.01)

(52) U.S. Cl. .............. 280/781; 280/785; 280/124.109; 180/312

(58) Field of Classification Search ............. 280/781, 280/785, 788, 124.109; 180/312
See application file for complete search history.

(56) References Cited

U.S. PATENT DOCUMENTS

| 1,468,522 | A | * | 9/1923 | Snell et al. ............... 180/315 |
| 2,254,282 | A | * | 9/1941 | Griswold ................. 180/312 |
| 2,695,182 | A | * | 11/1954 | Folz .................... 285/123.1 |
| 4,263,980 | A | * | 4/1981 | Harlow et al. ............ 180/292 |
| 5,005,864 | A | * | 4/1991 | Chachere ................. 280/800 |
| 5,915,727 | A |   | 6/1999 | Bonnville |
| 5,934,733 | A |   | 8/1999 | Henley |
| 5,997,038 | A | * | 12/1999 | Dostert et al. ........... 280/781 |
| 6,330,778 | B1 | * | 12/2001 | Jakobsson .............. 52/729.1 |
| 6,389,697 | B1 |   | 5/2002 | Benoit |
| 6,408,974 | B1 | * | 6/2002 | Viduya et al. ........... 180/312 |

(Continued)

FOREIGN PATENT DOCUMENTS

DE    19822731    11/1999

(Continued)

*Primary Examiner*—John Q. Nguyen
*Assistant Examiner*—Joselynn Y. Sliteris
(74) *Attorney, Agent, or Firm*—Pillsbury Winthrop Shaw Pittman LLP (57) ABSTRACT

A cross member for a motor vehicle includes an elongated, non-cast center structure and first and second castings. The center structure is formed as a one-piece, unitary structure and has a first end, a mid portion, and a second end. The first casting is rigidly connected to the first end of the center structure and the second casting is rigidly connected to the second end of the center structure. Each of the castings is configured and arranged to be attached to a respective motor vehicle element.

38 Claims, 4 Drawing Sheets

U.S. PATENT DOCUMENTS

| | | | |
|---|---|---|---|
| 6,533,059 B2 * | 3/2003 | Lecuit | 180/311 |
| 6,634,673 B1 * | 10/2003 | Verhaeghe | 280/781 |
| 6,783,157 B2 * | 8/2004 | Huang et al. | 280/785 |
| 2002/0170766 A1 * | 11/2002 | Gantz et al. | 180/311 |

FOREIGN PATENT DOCUMENTS

| | | |
|---|---|---|
| DE | 10023506 | 10/2001 |
| EP | 1270374 | 1/2003 |

* cited by examiner

CROSS MEMBER FOR A MOTOR VEHICLE

CROSS REFERENCE TO RELATED APPLICATIONS

This is the U.S. National Stage of PCT/US03/030195, filed Sep. 22, 2003, which in turn claims priority to U.S. Provisional Patent Application No. 60/414,417, filed Sep. 30, 2002, both of which are incorporated herein in their entirety by reference.

FIELD OF THE INVENTION

The present invention relates to motor vehicle manufacturing. More specifically, illustrative embodiments of the present invention relate to structural members for constructing automobiles and to methods for making the same.

BACKGROUND

Motor vehicles are typically constructed utilizing one or more frame or frame-like components that may be connected to one another and/or to other vehicle components. Frame components may provide structural support for portions of a vehicle and may provide points of attachment for various vehicle components. Frame component construction is complicated for a number of reasons including, for example, structural requirements, performance demands, and shape configuration requirements. One frame component, cross members, are conventionally formed as a welded assembly of stamped members or as a one-piece casting. However, the stamped cross members require complex welding of multiple parts and the one-piece cast cross members are expensive to manufacture and heavy.

SUMMARY

The present invention can be embodied in a cross member for a motor vehicle comprising an elongated center structure having a first end, a mid portion, and a second end, the center structure being formed as a one-piece, unitary, non-cast structure, a first casting rigidly connected to the first end of the center structure, and a second casting rigidly connected to the second end of the center structure, each of the first and second castings being configured and arranged to be attached to a respective motor vehicle element.

The present invention may also be embodied in a frame for a motor vehicle comprising first and second side frame members, and a cross member coupled to and extending between the first and second side frame members, the cross member having an elongated, center structure having a first end, a mid portion, and a second end, the center structure being formed as a one-piece, unitary, non-cast structure, a first casting rigidly connected to the first end of the center structure, and a second casting rigidly connected to the second end of the center structure, the first and second castings being attached to the first and second side rails, respectively.

The present invention may also be embodied in a method of forming a cross member for a motor vehicle, the method comprising forming an elongated one-piece, unitary center structure by a method other than casting such that the center structure has a first end, a mid portion, and a second end; forming first and second cast structures by casting, each cast structure being configured and arranged to be attached to respective motor vehicle elements; and connecting the first and second cast structures to the first and second ends, respectively, of the center structure to form a rigid connection between the center structure and the first and second cast structures.

The present invention may also be embodied in a method of forming a motor vehicle frame, comprising forming an elongated, center structure by a method other than casting such that the center structure has a first end, a mid portion, and a second end; forming first and second cast structures by casting, each cast structure being configured and arranged to be attached to respective motor vehicle elements; connecting the first and second cast structures to the first and second ends, respectively, of the center structure to form a rigid connection between the center structure and the first and second cast structures; and connecting the first cast structure to a first motor vehicle frame member; and connecting the second cast structure to a second motor vehicle frame member.

Other aspects, features, and advantages of the present invention will become apparent from the following detailed description of the illustrated embodiments, the accompanying drawings, and the appended claims.

DETAILED DESCRIPTION OF ILLUSTRATED EMBODIMENTS

Figure 1:
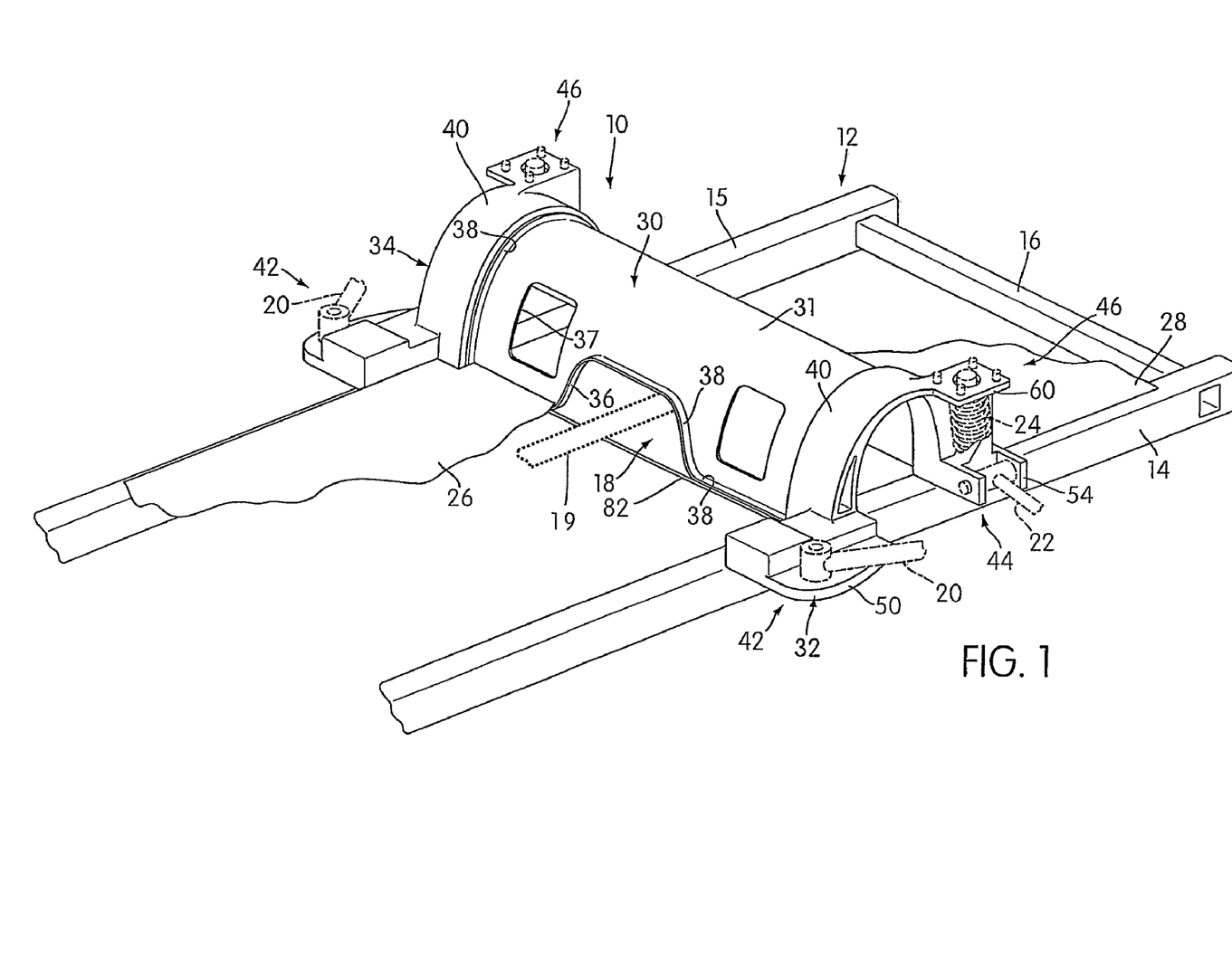
FIG. 1 is a perspective view of a cross member in accordance with one illustrative embodiment of the present invention, the cross member shown mounted on a motor vehicle frame and operatively connected to other vehicle components.

The present invention is generally directed to motor vehicle frame components and to apparatuses and methods for constructing the same. FIG. 1 shows an illustrative embodiment of an automobile frame component in the form of a structural cross member 10 constructed according to principles of the present invention. The cross member 10 is shown mounted on an example motor vehicle frame 12.

As set forth below, in the preferred embodiment, the cross member 10 includes a non-cast center structure 30, that is, a center structure 30 that is formed by a method other than casting. Preferably, center structure 30 is formed by stamping. The preferred cross member 10 further includes two cast, end structures 32 and 34, one at each end of center structure 30. The resulting preferred cross member 10 thus has the strength and shaping characteristics of castings at the ends of the cross member 10, where needed, while having a center structure 30 that is relatively lightweight and easy to manufacture. Thus, the best qualities of stampings and a casting are utilized and optimized in a single cross member 10.

The frame 12 (only portions of which are shown in FIG. 1) includes a pair of side rails 14, 15, and a cross rail 16 connected therebetween. Each of the rails 14-16 may be of tubular hydroformed construction, or may be of any other appropriate construction. The rails 14-16 and the frame 12 may be constructed as disclosed and described in commonly assigned U.S. Pat. No. 5,862,877, entitled Cradle Assembly, the entire disclosure of which is hereby incorporated herein by reference thereto.

As illustrated, the cross member 10 is mounted generally between the rear wheels of the assembled vehicle. Various vehicle components are mounted within or on the cross member 10 in the assembled vehicle. The cross member 10 has a "tunnel" structure, which provides a hollow interior which may be used to house the vehicle power train and associated mechanisms that are operatively connected to the rear wheels. As shown in FIG. 1, a central opening 18 is formed in the front of the cross member 10 to accommodate a portion 19 of the power train. One or more control arms 20, 22, a suspension assembly 24 for each wheel, and portions of the vehicle body are illustrated as being mounted on the ends of the cross member 10. Vehicle floor structure 26, 28 and various other vehicle components (e.g., seat risers) may be mounted to and/or partially supported by the cross member 10.

Figure 2:
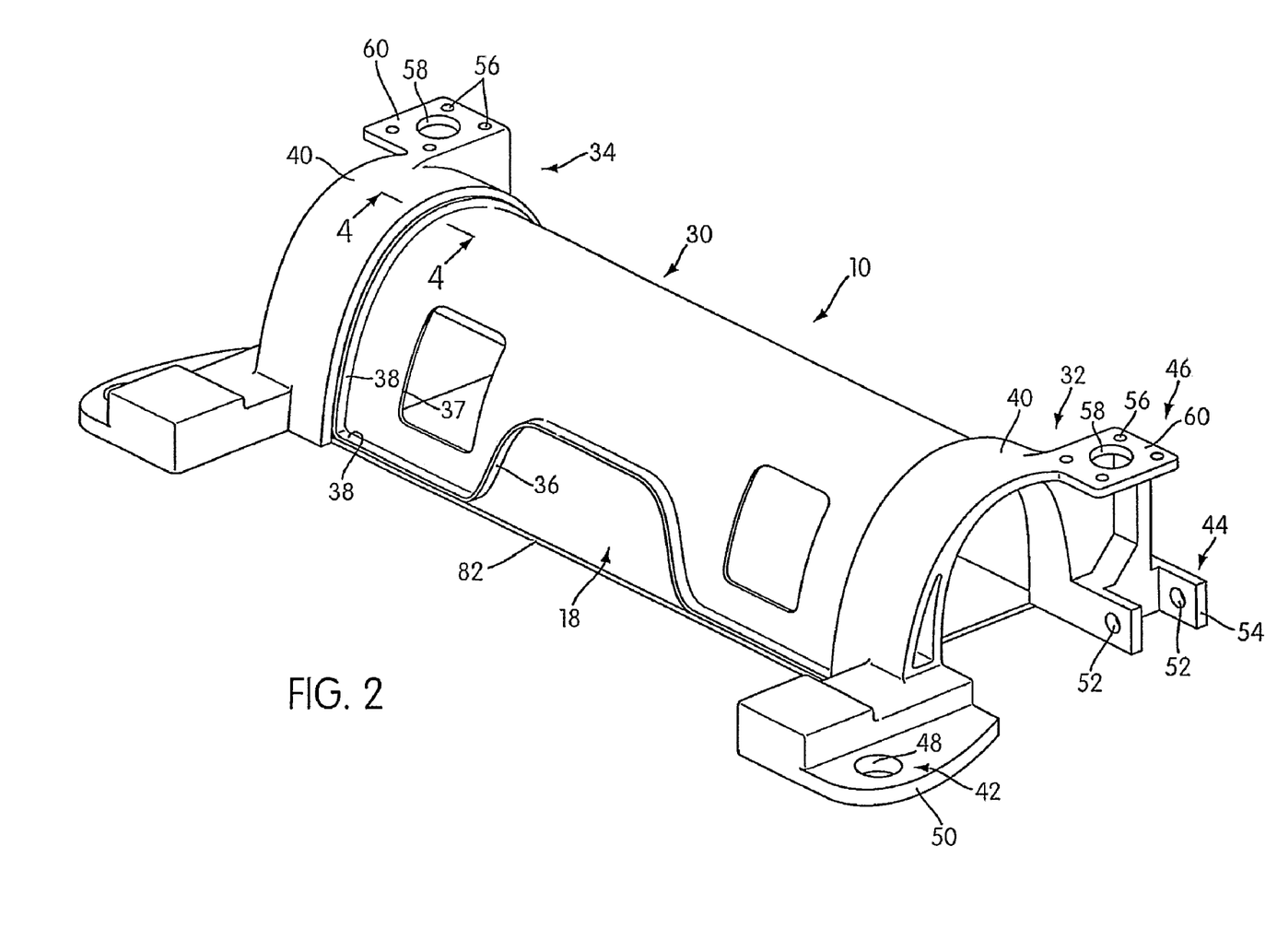
FIG. 2 is a perspective view illustrating the cross member of FIG. 1 in isolation.
Figure 3:
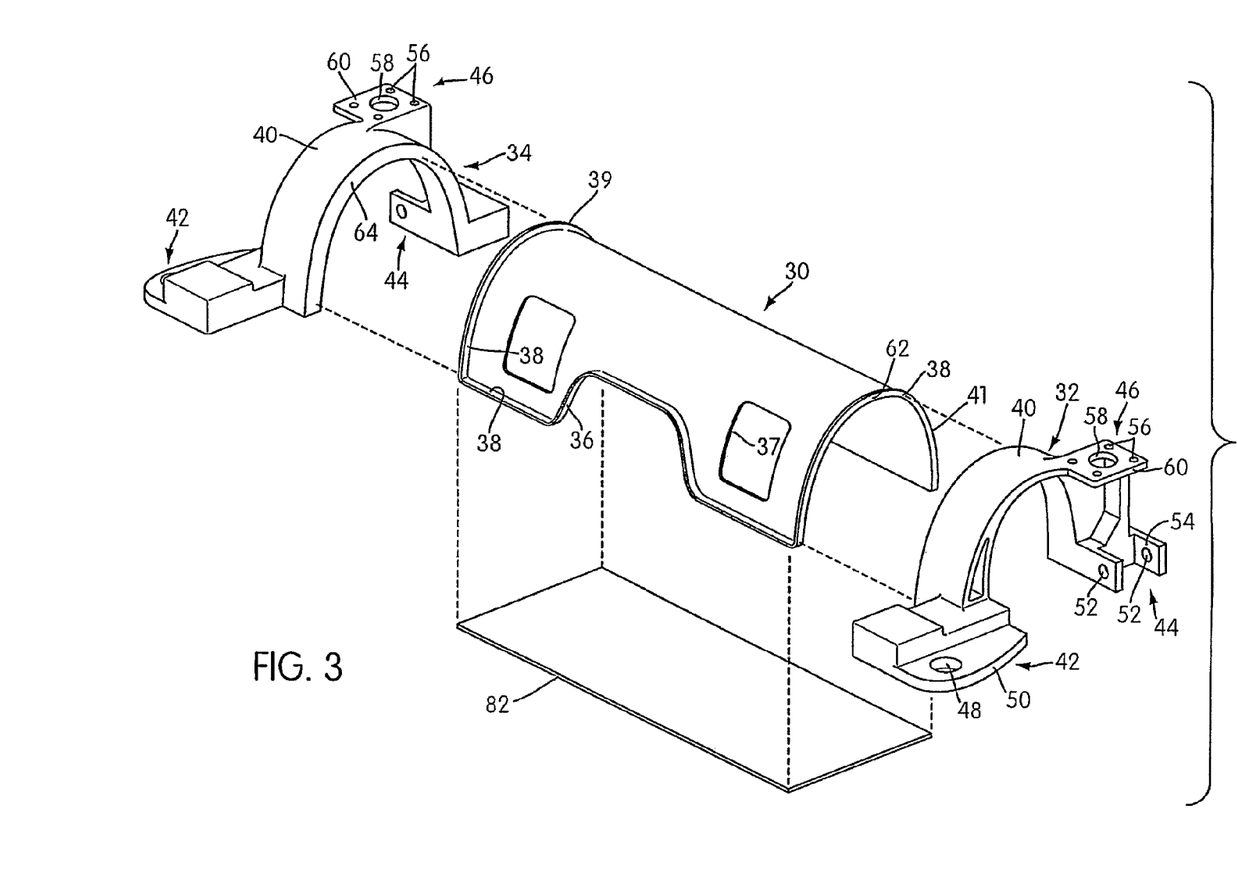
FIG. 3 is an exploded view of the cross member of FIG. 1 in isolation.

FIGS. 1-3 show views of the cross member 10 in isolation. The center structure 30 is preferably formed by shaping a sheet of a metallic material by stamping. Of course, center structure 30 can be made of non-cast methods other than stamping, if desired. The center structure 30 may be constructed of steel, aluminum, or other material of suitable strength. The center structure 30 is a one-piece, unitary structure having an inverted U-shaped cross-section. A notch 36 is formed in a mid portion of the center structure 30. Openings 37 of various sizes may be formed in the center structure 30 to reduce weight of the cross member 10. Although shown as one-piece, the center structure 30 can be formed from multiple members.

The wall 31 of the center structure 30 may be shaped to form one or more flange structures that extend along portions of the edges of the center structure 30. In the illustrative embodiment, a continuous integral flange 38 extends completely around the outer edge of the center structure 30. The flange 38 helps to rigidify and strengthen the center structure 30. End portions 39 and 41 of the flange 38 are used in the formation of joints which rigidly connect the cast end structures 32, 34 to the respective ends of the center structure 30, as considered below. The center of the cross member 10 typically experiences less stress than that borne by the end structures 32, 34. Stamped structures are generally simpler to construct, weigh less, and are less expensive than comparable cast structures. It is therefore advantageous to utilize a stamped structure to form the central portion of the cross member 10 connecting the two castings 32, 34.

The end portions of the cross member 10 bear a higher degree of load stress than the central portion of the cross member 10. For example, the load inputs and/or the load reactions from the control arms 20, 22 the suspension assembly 24 and/or from the body mounts are borne by the end portions of the cross member 10. The central portion of the cross member 10 bears relatively light loads, e.g., the load associated with the vehicle floor structure, seat risers. The cross member 10 is constructed so that the portions of the cross member 10 that bear greater stress have greater strength. This can be accomplished in several ways, such as, for example, by constructing the end portions of the cross member 10 from a stronger material than the material used to construct the central portion of the cross member 10 or, alternatively, by varying the thickness of portions of the cross member 10 so that the portions of the cross member 10 that bear greater loads have greater thickness. Each end structure 32, 34 is cast so that the portions of each end structure 32, 34 that bear greater stress have a greater thickness and the portions that bear lesser stress have a lesser thickness. Additionally or alternatively, each end structures 32, 34 can be constructed of a stronger material than the center structure 30.

The end structures 32, 34 are illustrated herein as being of mirror image construction to one another. Alternatively, each end structure 32 and 34 can be of different configurations. As illustrated, each end structure 32, 34 may be an integral cast structure constructed of an appropriate metallic material such as aluminum, steel, or other material of suitable strength. As illustrated, each end structure 32, 34 is shaped by casting to have an inverted U-shaped body portion 40, and a plurality of integral attachment structures 42, 44, 46 for attaching one or more vehicle elements such as the control arms 20, 22 and the vehicle suspension 24, respectively. The attachment structure 42 is in the form of an opening 48 formed in an integral wall portion 50 of each end structure 32, 34. The attachment structure 44 is in the form of a pair of aligned openings 52 formed in respective integral wall portions 54 of each end structure 32, 34. The attachment structure 46 is in the form of a plurality of openings 56, 58 formed in an integral wall portion 60 of each end structure 32, 34.

As mentioned above, the use of cast end structures 32, 34 at the ends of the cross member 10 enables the manufacturer to provide the various portions of the cross member 10 with varying thicknesses to manage the stresses resulting from the in-vehicle loads on the cross member 10. An example of this is evident in that each wall 50, 54, 56 of each attachment structure 42, 44, 46 can be constructed during the casting process to have sufficient thickness to handle the load to which each structure will be subjected. The use of castings on the ends of the cross member 10 also provides a high degree of dimensional accuracy and stability relative to, for example, a completely stamped and welded cross member. The cast structures 32, 34 may optionally be machined or spot-faced after casting to improve dimensional tolerances. Casting is also well suited for providing complex packaging geometry on the ends of the cross member 10.

Figure 4:
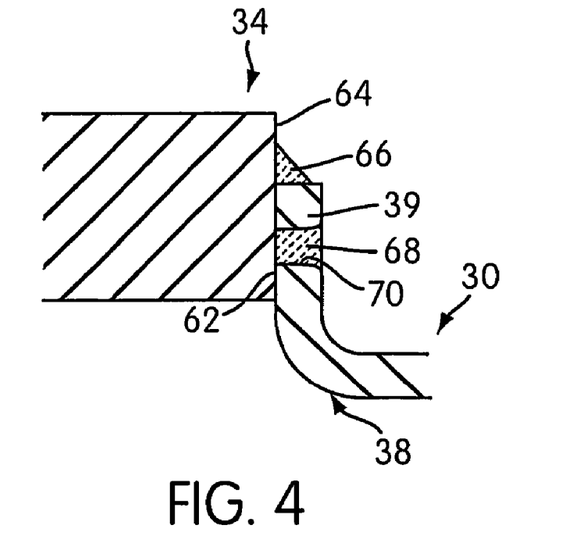
FIG. 4 is a cross-sectional view of the cross member taken through the line 4-4 of FIG. 2.

The manner in which each end structure 32, 34 is rigidly connected to an end of the center structure 30 can be appreciated from FIG. 4, which shows, in cross section, a portion of the joint between the center structure 30 and the end structure 34. An outer surface 62 of end portion 39 of the flange 38 is placed against a side surface 64 of the end structure 34. The end structure 34 and the center structure 30 can be placed in an assembly fixture to align the structures 30, 34 prior to joining them together and to hold them together to facilitate joint formation. The construction of the center structure 30 and each end structure 32, 34 allows relative movement between the flange 38 and the surface 64 of the end structure 34 so that the center structure 30 and each end structure 32, 34 can be moved relative to one another in a fore-aft/up-down slip plane prior to joining to assure dimensional accuracy of the cross member 10.

The structures 30, 34 can be connected to one another using, for example, a structural adhesive, appropriate fasteners (e.g., rivets, bolts), or welding. Any of these methods can be used alone or together with one another in any combination. Also, appropriate welding methods that can be used to join the structures to one another including, for example, MIG welding, spot welding, plasma arc welding, and electromagnetic welding. In the example of FIG. 4, the structures 30, 34 are connected with an edge weld 66, and with a spot weld 68. The spot weld 68 is formed in an opening 70 in the flange 38. Plasma arc welding and MIG puddle welding are feasible methods for spot welding the structures 30, 34 to one another.

The end structures 32 and 34 and the center structure 30 could be constructed to provide other joint geometries. For example, the structures 30, 32 and 34 could be constructed to provide a joint having an overlapping geometry or, alternatively, an abutting geometry. For example, each cast end structure 32, 34 and the center structure 30 could each include wall structure that was shaped so that each casting could be rigidly connected to the center structure by rigidly connecting wall structure on each casting in lapped relation to wall structure on the center structure.

Figure 5:
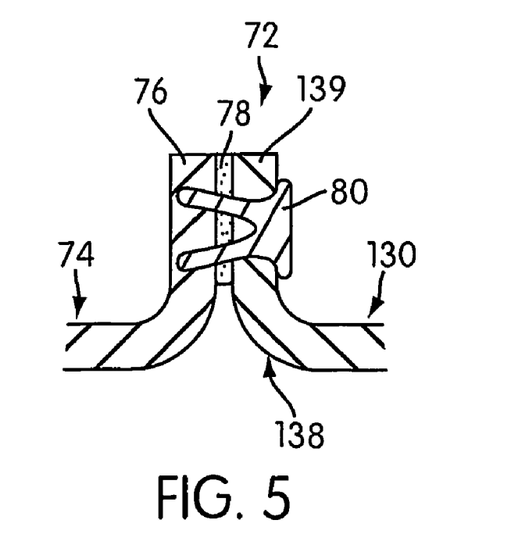
FIG. 5 is a cross-sectional view similar to the view of FIG. 4 except showing another illustrative embodiment for joining the portions of the cross member in accordance with another illustrative embodiment of the present invention.

An example of another embodiment of a joint 72 is shown in FIG. 5. In this example, the end structure 74 is shaped during casting to have a flange 76 and is connected to a center structure 130, which is similar to center structure 30. The flanges 76 and 138, which is similar to end structure 34, may be joined together using, for example, any combination of the joining methods mentioned or incorporated herein. Flange 138 corresponds and is similar to flange 38 above.

The example joint 72 is formed utilizing a structural adhesive 78 (illustrated with an exaggerated thickness) and a Henrob rivet 80. The structural adhesive 78 may be applied to one or both flanges 38, 76, and then the structures 130, 74 may be held together in an assembly fixture. A fastener such as the self-piercing Henrob rivet 80 is mechanically fastened through the flange 138 of the stamped structure 130 and into the cast structure 74. The structural adhesive 78 may then be cured during an e-coating process. The combination of mechanical fasteners (e.g., bolts, rivets) and a structural adhesive eliminates problems that may be associated with welding a stamping to a casting including, for example, thermal distortion and/or a reduction in joint strength in the areas of the joint that are heated during the welding process.

As seen in FIGS. 1-3, a cover structure 82 may optionally be included in the cross member 10. The cover structure 82 may be mounted on a lower portion of the center structure 30 beneath the cross member 10 either before or after the end structures 32, 34 are mounted to the center structure 30. The cover structure 82 is illustrated in the form of a sheet or plate that may be constructed of a metallic material such as steel or aluminum. The cover structure 82 may be rigidly connected to the center structure 30 using mechanical fasteners (e.g., bolts, rivets), welding, adhesive or any other appropriate method alone or in any combination with one another. The cover structure 82 "closes" the bottom of the cross member 10 and provides additional strength and rigidity to the cross member 10. The cover structure 82 as illustrated is connected to only the center structure 30 but may be constructed to be long enough to be connected to and to cover the center structure 30 and the end structures 32, 34. In such a configuration, a control arm bushing can optionally be mounted between the cover structure 82 and each cast end structure 32, 34.

Thus, while the invention has been disclosed and described with reference with a limited number of embodiments, it will be apparent that variations and modifications may be made thereto without departure from the spirit and scope of the invention and various other modifications may occur to those skilled in the art. Therefore, the following claims are intended to cover modifications, variations, and equivalents thereof.

What is claimed is:

1. A cross member for a motor vehicle, comprising:
    an elongated, center structure having a first end, a mid portion, and a second end, said center structure being formed as a non-cast structure;
    a first casting rigidly connected to said first end of said center structure; and
    a second casting rigidly connected to said second end of said center structure,
    each of said first and second castings having a respective integral attachment structure for attaching a respective motor vehicle element associated with a respective, wheel of a motor vehicle,
    each of said first and second ends of said center structure including a flange extending from said center structure and constructed and arranged to rigidify and strengthen said center structure while providing a surface that can be placed against a side surface of a respective casting of said first and second castings for attachment with said respective casting of said first and second castings,
    wherein the center structure includes a central opening to accommodate a portion of a vehicle power train extending through the central opening into a hollow interior of the center structure.

2. A cross member according to claim 1, wherein said center structure is constructed as a one-piece, unitary structure.

3. A cross member according to claim 2, wherein said center structure comprises a metallic material that is selected from the group consisting of steel and aluminum.

4. A cross member according to claim 1, wherein said center structure has a U-shaped cross section.

5. A cross member according to claim 4, further comprising a cover mounted beneath and rigidly secured to said center structure to close the U-shaped cross-section of said center structure.

6. A cross member according to claim 1, wherein each of said castings includes a flange and wherein each of said castings is rigidly connected to said center structure by rigidly connecting said flange of each casting to said center structure.

7. A cross member according to claim 1, wherein each of said castings is rigidly connected to said center structure using fasteners.

8. A cross member according to claim 7, wherein said fasteners are rivets.

9. A cross member according to claim 7, wherein each casting is rigidly connected to said center structure using an adhesive.

10. A cross member according to claim 1, wherein each casting is rigidly connected to said center structure by welding.

11. A cross member according to claim 1, wherein
    each of said flanges of said first and second ends of said center structure forms part of a single, continuous flange that extends along the entire perimeter of said center structure.

12. A cross member according to claim 1, wherein
    each of said flanges of said first and second ends of said center structure extends transversely relative to said elongated center structure.

13. A cross member according to claim 1, wherein each of said integral attachment structures comprises an integral attachment structure for attaching a respective wheel control arm to the cross member for relative pivotal movement about an axis that extends through the attachment structure.

14. A cross member according to claim 13, in combination with first and second vehicle wheel control arms, each control arm being attached to a respective one of the integral attachment structures for relative pivotal movement about an axis that extends through the attachment structure.

15. A cross member according to claim 1, wherein each of said integral attachment structures comprises an integral attachment structure for attaching a wheel suspension assembly directly to the cross member.

16. A cross member according to claim 1 in combination with a portion of a vehicle power train, wherein the portion of the vehicle power train extends through the central opening into the hollow interior of the center structure.

17. A frame for a motor vehicle, comprising:
first and second side frame members; and
a cross member coupled to and extending between said first and second side frame members, said cross member having
an elongated, center structure having a first end, a mid portion, and a second end, said center structure being formed as a one-piece, unitary, non-cast structure,
a first casting rigidly connected to said first end of said center structure, and
a second casting rigidly connected to said second end of said center structure,
said first and second castings being attached to said first and second side frame members, respectively,
each of said first and second castings having a respective integral attachment structure for attaching a respective motor vehicle element associated with a respective wheel of a motor vehicle, and
each of said first and second ends of said center structure including a flange extending from said center structure and constructed and arranged to rigidify and strengthen said center structure while providing a surface that can be placed against a side surface of a respective casting of said first and second castings for attachment with said respective casting of said first and second castings,
wherein the center structure includes a central opening to accommodate a portion of a vehicle power train extending through the central opening into a hollow interior of the center structure.

18. A frame according to claim 17, wherein said center structure has a U-shaped cross section and further comprises a cover mounted beneath and rigidly secured to said center structure.

19. A frame according to claim 17, wherein
each of said flanges of said first and second ends of said center structure forms part of a single, continuous flange that extends along the entire perimeter of said center structure.

20. A frame according to claim 17, wherein
each of said flanges of said first and second ends of said center structure extends transversely relative to said elongated center structure.

21. A frame according to claim 17, wherein each of said integral attachment structures comprises an integral attachment structure for attaching a respective wheel control arm to the cross member for relative pivotal movement about an axis that extends through the attachment structure.

22. A frame according to claim 17, wherein each of said integral attachment structures comprises an integral attachment structure for attaching a wheel suspension assembly to the cross member.

23. A frame for a motor vehicle according to claim 17 in combination with a portion of a vehicle power train, wherein the portion of the vehicle power train extends through the central opening into the hollow interior of the center structure.

24. A method of forming a cross member for a motor vehicle, comprising:
forming an elongated, center structure by a method other than casting such that the center structure has a first end, a mid portion, and a second end;
forming first and second cast structures by casting, each cast structure having a respective integral attachment structure for attaching a respective motor vehicle element associated with a respective wheel of a motor vehicle; and
connecting the first and second cast structures to the first and second ends, respectively, of the center structure to form a rigid connection between the center structure and the first and second cast structures;
wherein each of the first and second ends of the center structure are formed to include a flange extending from the center structure and constructed and arranged to rigidify and strengthen the center structure while providing a surface that is placed against a side surface of a respective cast structure of the first and second cast structures for the connection with the respective cast structure of the first and second cast structures,
wherein forming the center structure comprises forming in the center structure a central opening to accommodate a portion of a vehicle power train extending through the central opening into a hollow portion of the center structure.

25. A method according to claim 24, wherein the center structure is formed by stamping.

26. A method according to claim 24, wherein the connecting of the first and second cast structures to the center structure includes attaching respective flanges of the first and second cast structures to the center structure.

27. A method according to claim 26, wherein the connecting is carried out by welding.

28. A method according to claim 26, wherein the connecting is carried out by attaching fasteners between each of the cast structures and the center structure.

29. A method according to claim 24, wherein the center structure is formed as a one-piece, unitary structure.

30. A method according to claim 24, wherein
connecting each of the first and second cast structures to the first and second ends includes moving one of the first cast structure and the first end in a fore-aft/up-down slip plane prior to forming a rigid connection to assure dimensional accuracy.

31. A method according to claim 24, wherein each of said integral attachment structures comprises an integral attachment structure for attaching a respective wheel control arm to the cross member for relative pivotal movement about an axis that extends through the attachment structure.

32. A method according to claim 24, wherein each of said integral attachment structures comprises an integral attachment structure for attaching a wheel suspension assembly directly to the cross member.

33. The method according to claim 24, further comprising extending a portion of a vehicle power train through the central opening into the hollow portion of the center structure.

34. A method of forming a motor vehicle frame, comprising:
forming an elongated, center structure by a method other than casting such that the center structure has a first end, a mid portion, and a second end;
forming first and second cast structures by casting, each cast structure having a respective integral attachment structure for attaching a respective motor vehicle element associated with a respective wheel of a motor vehicle;
connecting the first and second cast structures to the first and second ends, respectively, of the center structure to form a rigid connection between the center structure and the first and second cast structures, wherein each of the first and second ends of the center structure are formed to include a flange extending from the center structure and constructed and arranged to rigidify and strengthen the center structure while providing a surface that is placed against a side surface of a respective cast structure of the first and second cast structures for the connection with the respective cast structure of the first and second cast structures;

connecting the first cast structure to a first motor vehicle frame member; and connecting the second cast structure to a second motor vehicle frame member, wherein forming the center structure comprises forming in the center structure a central opening to accommodate a portion of a vehicle power train extending through the central opening into a hollow portion of the center structure.

35. A method according to claim 34, wherein connecting each of the first and second cast structures to the first and second ends includes moving one of the first cast structure and the first end in a fore-aft/up-down slip plane prior to forming a rigid connection to assure dimensional accuracy.

36. A method according to claim 34, wherein each of said integral attachment structures comprises an integral attachment structure for attaching a respective wheel control arm to the cross member for relative pivotal movement about an axis that extends through the attachment structure.

37. A method according to claim 34, wherein each of said integral attachment structures comprises an integral attachment structure for attaching a wheel suspension assembly directly to the cross member.

38. The method according to claim 34, further comprising extending a portion of a vehicle power train through the central opening into the hollow portion of the center structure.

* * * * *